June 10, 1941. P. G. WILLIAMS ET AL Re. 21,825

STORE FURNITURE

Original Filed Aug. 7, 1939 6 Sheets-Sheet 1

Inventors
Paul G. Williams
Kenneth C. Welch
By Lawrence & Van Antwerp
Attorneys

June 10, 1941. P. G. WILLIAMS ET AL Re. 21,825

STORE FURNITURE

Original Filed Aug. 7, 1939 6 Sheets-Sheet 2

Inventors
Paul G. Williams
Kenneth C. Welch
By Livernance and Van Antwerp
Attorneys June 10, 1941. P. G. WILLIAMS ET AL Re. 21,825

STORE FURNITURE

Original Filed Aug. 7, 1939 6 Sheets-Sheet 3

Inventors
Paul G. Williams
Kenneth C. Welch
By J. Liserance and Van Antwerp
Attorneys June 10, 1941. P. G. WILLIAMS ET AL Re. 21,825

STORE FURNITURE

Original Filed Aug. 7, 1939 6 Sheets-Sheet 4

Inventors
Paul G. Williams
Kenneth C. Welch
By Liveance and Van Antwerp
Attorneys

STORE FURNITURE

Original Filed Aug. 7, 1939 6 Sheets-Sheet 5

Inventors
Paul G. Williams
Kenneth C. Welch
By Livermore and Van Antwerp
Attorneys June 10, 1941. P. G. WILLIAMS ET AL Re. 21,825

STORE FURNITURE

Original Filed Aug. 7, 1939 6 Sheets-Sheet 6

Inventors
Paul G. Williams
Kenneth C. Welch
By Lisenance and Van Antwerp
Attorneys Reissued June 10, 1941

Re. 21,825

UNITED STATES PATENT OFFICE 21,825

STORE FURNITURE

Paul G. Williams and Kenneth C. Welch, Grand Rapids, Mich., assignors to Grand Rapids Store Equipment Company, Grand Rapids, Mich., a corporation of Michigan Original No. 2,208,237, dated July 16, 1940, Serial No. 288,722, August 7, 1939. Application for reissue February 19, 1941, Serial No. 379,737

17 Claims. (Cl. 312—156)

This invention relates to store furniture, particularly to furniture for department stores.

The articles of merchandise which are carried and displayed in department stores are of many and varied characters and require specific holding or carrying devices therefor. The arrangements which may be required in one store may materially differ from those in another store and it would seldom occur that two arrangements would be exactly identical in two independent stores. This has required a very considerable manufacture of special constructions to fit the needs of particular merchants, thus greatly increasing the cost of production. In the present invention we have devised a base construction which is the same in all store installations but which may be very quickly and readily arranged to fit the particular needs of any merchant for the stock which he ordinarily has. Such base structure may be produced in large quantity runs at the factory with the savings which follow from a large quantity standardized production. The various attachments or auxiliaries which may be selectively used and connected with the base structure are also produced in quantity with resultant savings in manufacturing cost, and for the particular needs of any merchant there is a large variety of such attachments or auxiliaries which may be used, so that the number of combinations which can be produced is very large and from one of them the needs of substantially any store may be supplied.

In addition with our invention such attachments or auxiliaries which are adapted for selective use with the base structures are assembled therewith or connected thereto in a manner which permits their removal and replacement by other of the auxiliary structures, whereby once the store is supplied with the base structure of a merchandising case or cabinet, it may thereafter, if the desire or need arises, be very quickly changed over by removing the attachments or auxiliaries in whole or in part which have been used, replacing them with others. By our invention there is attained a great flexibility in the fixtures which may be supplied to merchants, an enormous number of arrangements and designs are possible and the needs of the merchants in any and all types of stores from the smallest to the largest are readily supplied, together with an ability to substantially make over the fixtures after they have been installed and used in a store, into others to serve other purposes, such making over being at relatively little additional expense. Furthermore, the initial expense of production is greatly reduced, the manufacture of the parts is standardized, large runs of the standard parts through the factory are had, thus reducing the cost of manufacture and to the buyer, both for initial equipment and for further equipment which may be required from time to time. And when further equipment is purchased, it frequently happens that the merchant will want to rebuild or rearrange the old equipment which he has on hand and this can be accomplished also at a minimum of expense.

To these ends and to many others not at this time specifically enumerated, we have made the invention herein disclosed, which may be understood from the following description, taken in connection with the accompanying drawings, in which.

Figure 3:
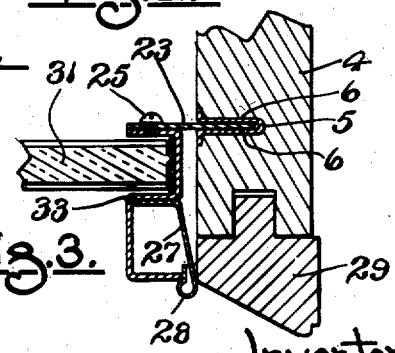
Fig. 3 is a fragmentary enlarged horizontal section on the same plane as Fig. 2, at one side of the case.
Figure 3A:
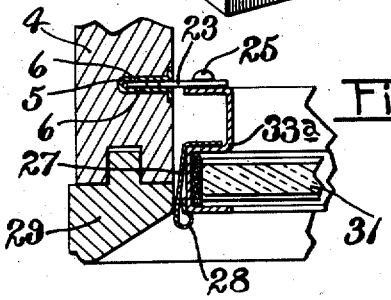

Fig. 3*a* is a similar horizontal section at the opposite side.

Figure 1:
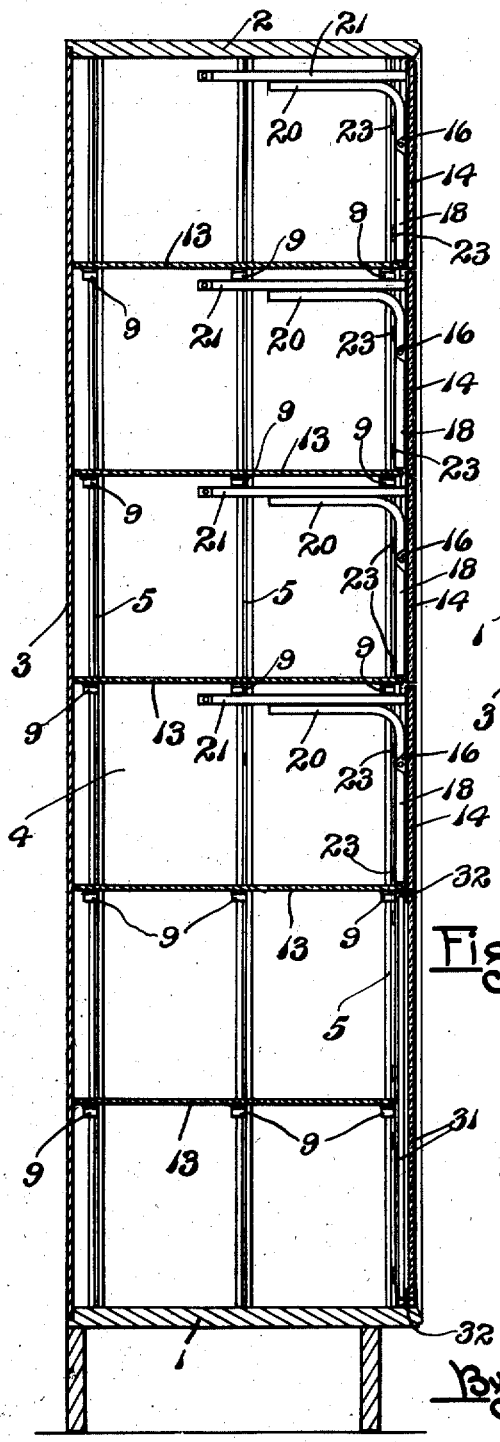
Fig. 1 is a vertical section through the fundamental or base cabinet carcass structure of our invention, having applied thereto various auxiliaries or attachments to complete the fixture for use in a store.
Figure 2:
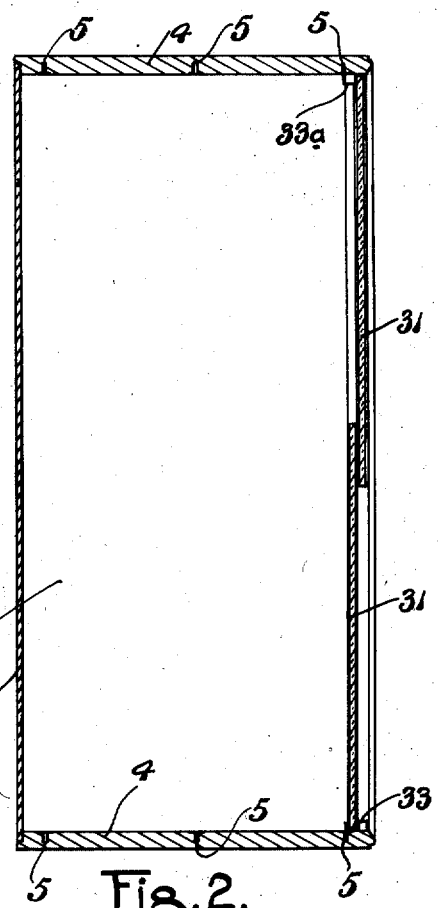
Fig. 2 is a horizontal section through the lower part of the case or cabinet shown in Fig. 1.
Figure 4:
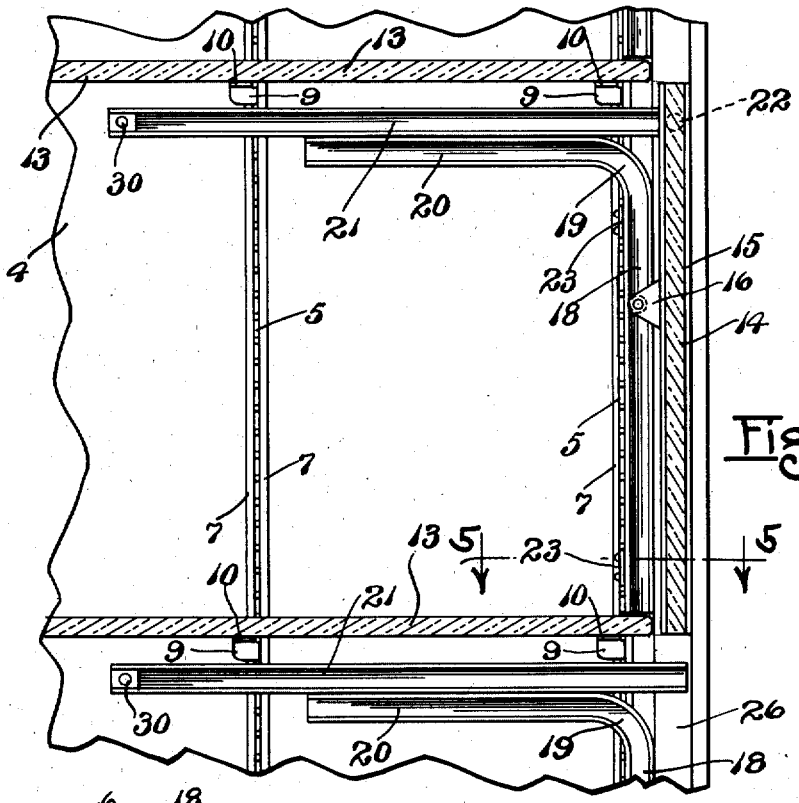

Fig. 4 is a fragmentary enlarged vertical section similar to that shown in Fig. 1, showing in more detail the attachment or auxiliary which is used for supplying drop-doors of a disappearing type between shelves and at the front.

Figure 5:
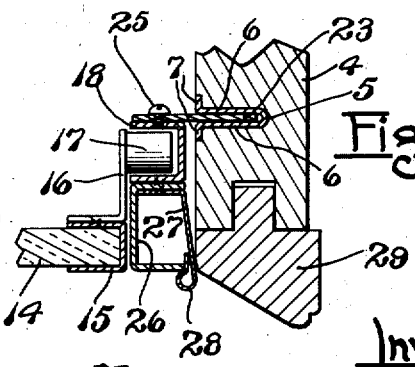

Fig. 5 is a fragmentary enlarged horizontal section, substantially on the plane of line 5—5 of Fig. 4, looking downwardly.

Figure 6:
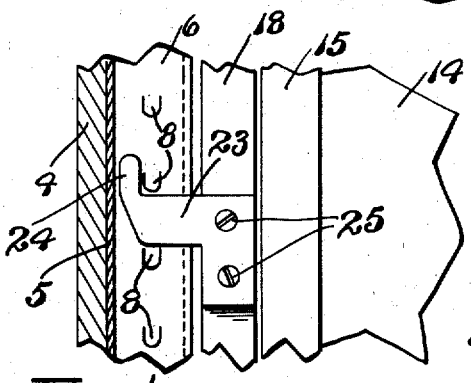

Fig. 6 is a fragmentary vertical section at right angles to that shown in Fig. 5 and showing the mounting means used in elevation.

Figure 7:
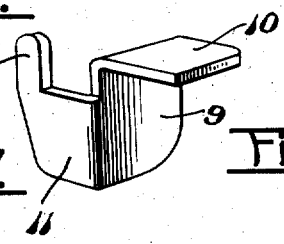

Fig. 7 is a perspective view of a shelf supporting bracket used with our invention.

Figure 8:
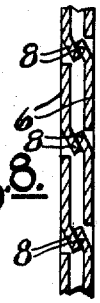

Fig. 8 is a fragmentary longitudinal vertical section through a metal channel, a plurality of which are used the full length of the vertical sides of the cabinet and housed or embedded therein.

Figure 9:
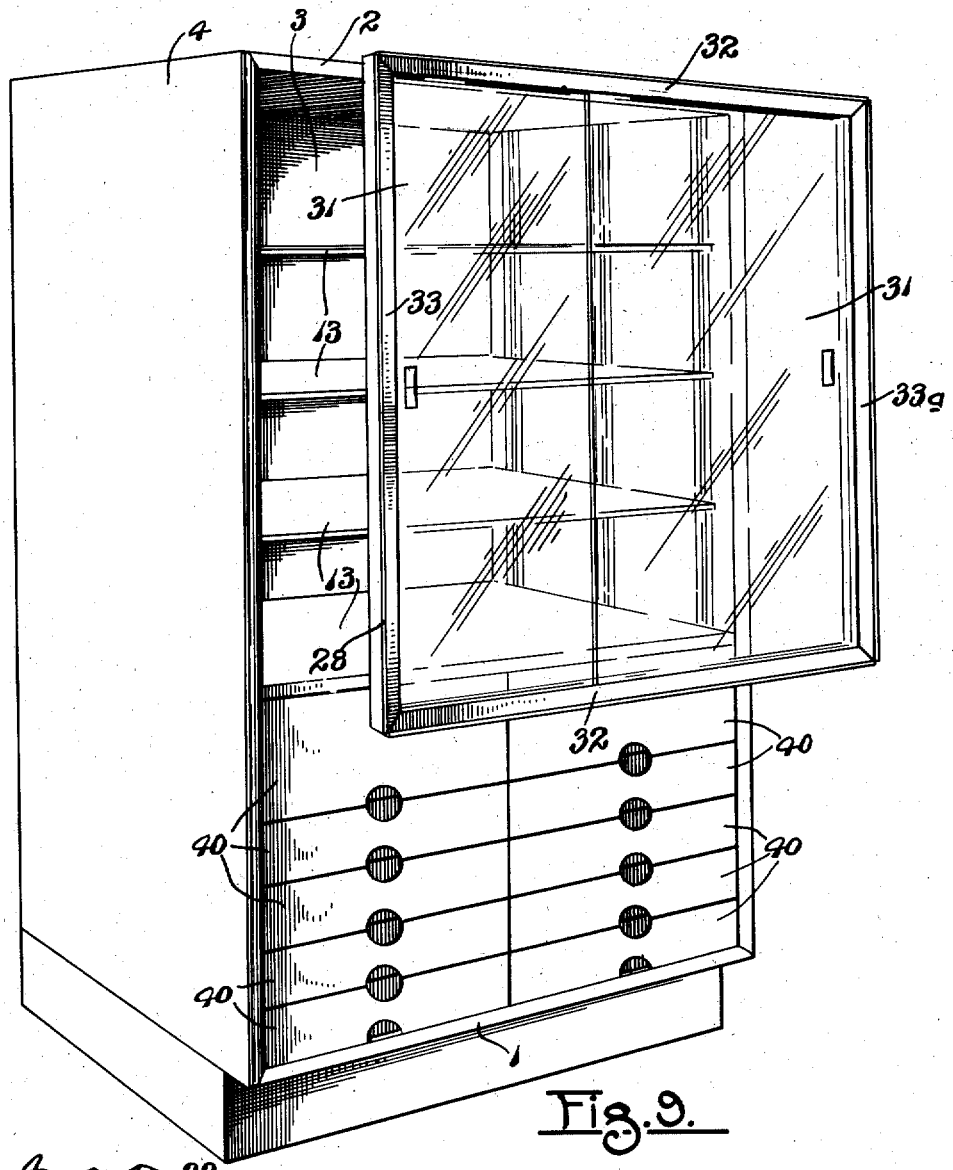

Fig. 9 is a perspective view of a case in accordance with our invention, the lower portion of which is equipped with drawers, the upper part with shelves and at the front of the upper part an auxiliary attachment in the form of a sliding glass door frame provided, which frame is detachably and removably secured in place at the front of the case and of the shelves.

Figure 10:
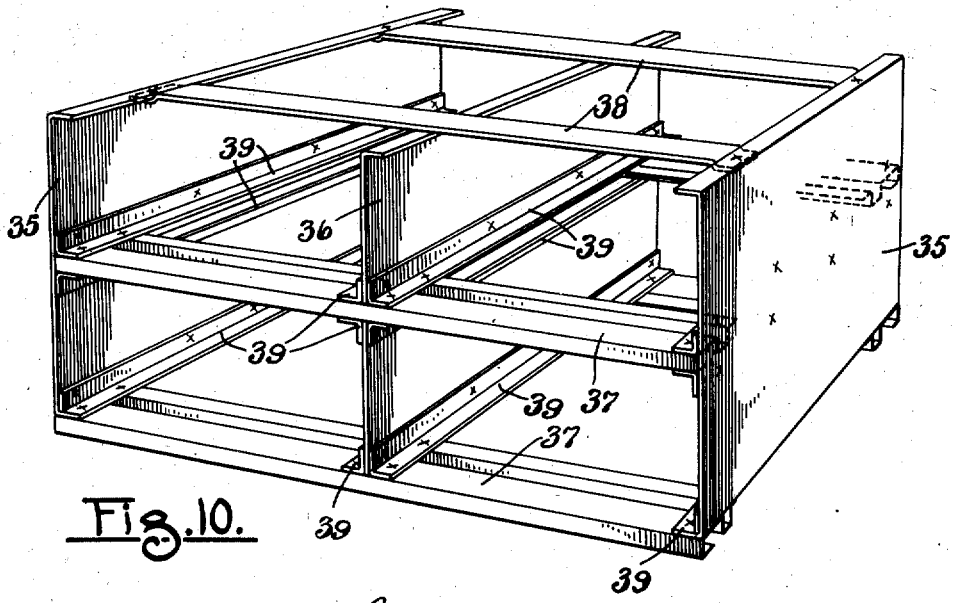

Fig. 10 is a perspective view of the drawer carrying frame which may be made in a plurality of standard sizes to carry a number of vertical rows of drawers and which is readily insertible in the base construction of the case or cabinet at desired positions therein.

Figure 11:
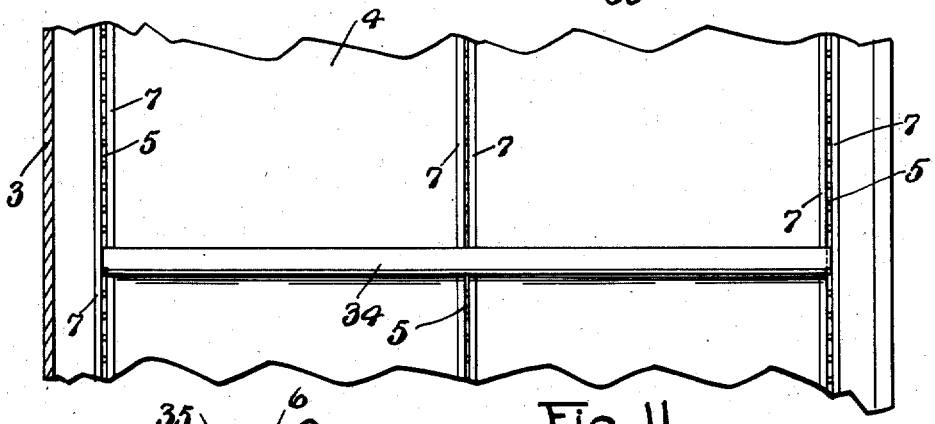

Fig. 11 is a fragmentary vertical section and side elevation, showing the manner in which horizontally disposed angle bars for carrying the drawer sections or other similar auxiliaries may be adjustably mounted on a side of the case or cabinet.

Figure 12:
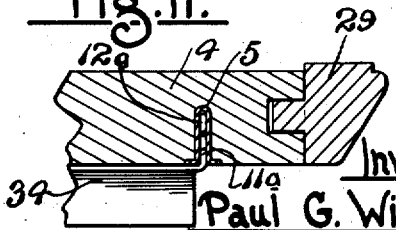

Fig. 12 is a fragmentary horizontal section illustrating the construction at each end of said horizontal bar for detachably connecting it with the supporting channels.

Figure 13:
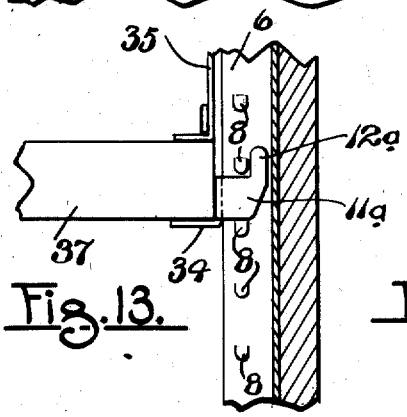

Fig. 13 is a fragmentary vertical section at right angles to Fig. 12, showing the structure at each end of the supporting bar and its manner of detachable connection.

Figure 14:
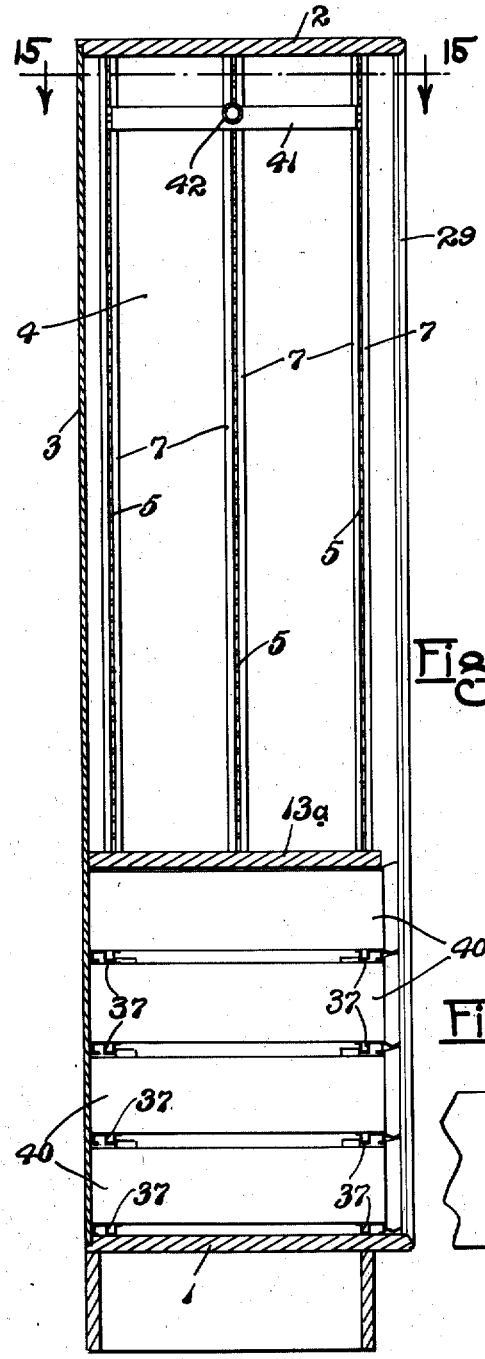

Fig. 14 is a vertical section similar to Fig. 1, with the base construction of case or cabinet shown as supplied with different auxiliaries, such as drawers in the lower part thereof and a detachable garment supporting rod at the upper part.

Figure 15:
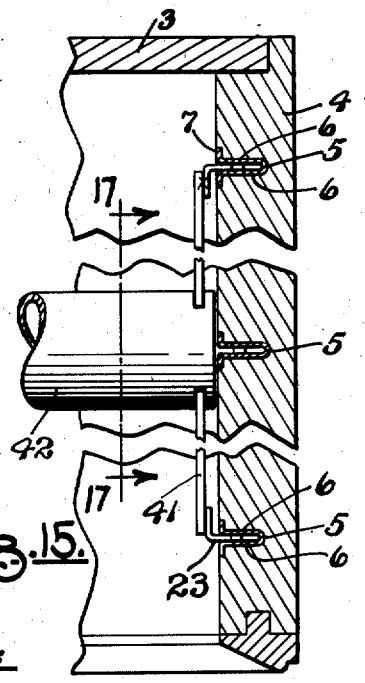

Fig. 15 is a fragmentary horizontal section taken at the upper part of the case on the plane of line 15—15 of Fig. 14, looking downwardly as indicated.

Figure 16:
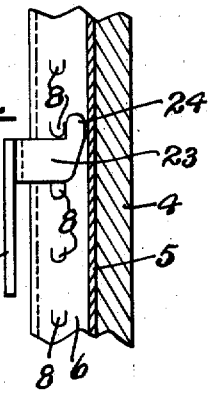

Fig. 16 is a section similar to Fig. 12, illustrating the manner of detachable connection of the elements which support the ends of said garment carrying rod.

Figure 17:
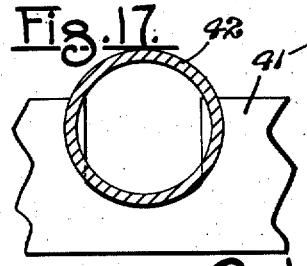

Fig. 17 is a fragmentary vertical section substantially on the plane of line 17—17 of Fig. 15, looking in the direction indicated by the arrows.

Figure 18:
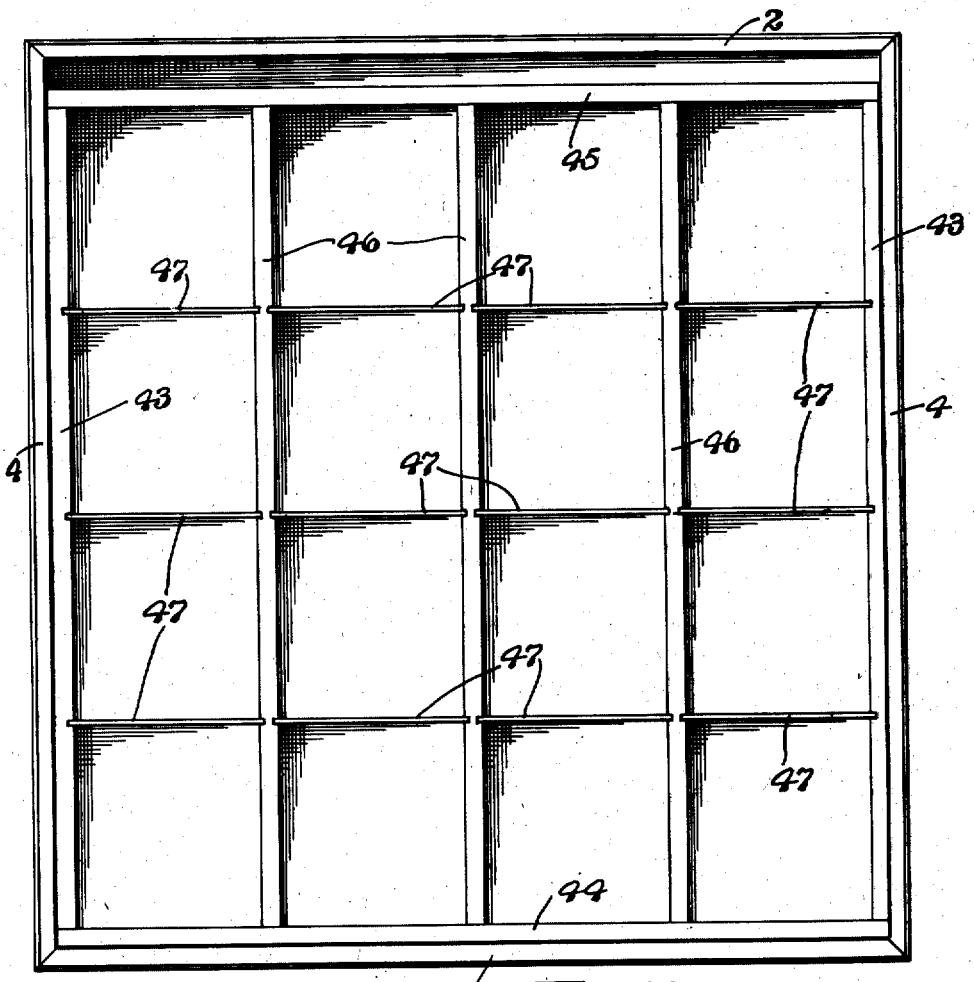
Figure 19:
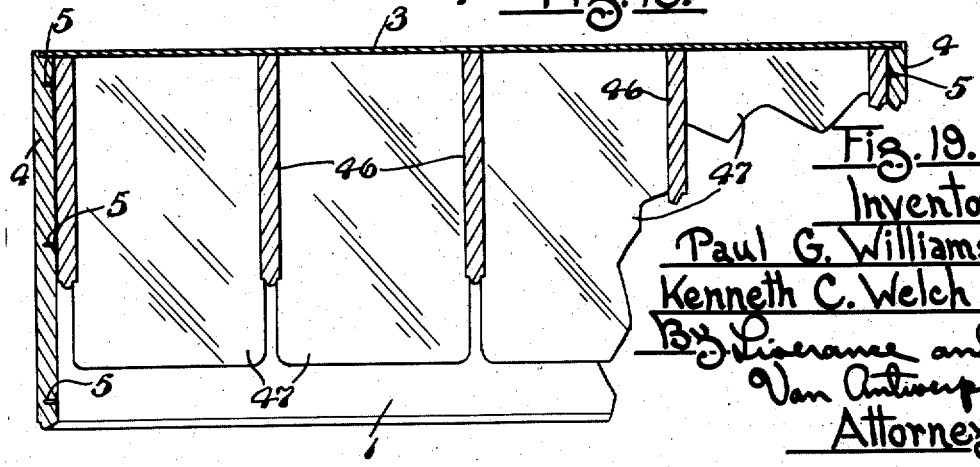

Fig. 18 is a front elevation showing the fundamental or base cabinet structure of our invention, having located therein one of many independent unit auxiliaries which may be directly inserted thereinto and removed therefrom to fill either the entire space or selected portions of the entire space therein, and Fig. 19 is a horizontal section therethrough.

Like reference characters refer to like parts in the different figures of the drawings.

The structure which is shown in the drawings as embodying our invention, has as its fundamental and basic element a cabinet carcass which has a horizontal bottom 1, a horizontal top 2, a back 3, and spaced apart parallel vertical ends 4, the front being open. In each of the ends 4 a plurality of metal channels, generally indicated at 5, are inserted in grooves cut vertically at the inner sides of and extending the full height of said sides 4. The channels 5 are each made from an elongated strip of sheet metal bent longitudinally into a U-shaped bend midway between its side edges to provide two narrowly spaced sides 6, each of which at its outer edge is turned outwardly in a short flange 7. The sides 6, as shown in Fig. 8, have tongues 8 struck inwardly, those at one side extending downwardly and inwardly at an acute angle to the vertical, and those at the other side upwardly and inwardly and coming against and contacting the tongues struck from the opposite side. These tongues are thus formed in cooperating pairs and such pairs of tongues are preferably equally vertically spaced from each other the full length of the channel members 5. In the length of a channel member there are a very large number of such cooperating pairs of lugs or tongues, the distance from one pair to another being relatively small. The ends 4 of the case or cabinet are readily provided with grooves routed out therein for the reception of the channel members which are received within the grooves or are securely held therein; and it is also contemplated that the flanges 7 may be received in shallow longitudinal recesses cut at the inner sides of the ends 4 for such purpose, as shown in Figs. 3 and 5, though as the thickness of the metal from which the channels 5 are made is small, the construction is operable and serves its purposes even though the terminal flanges 7 are brought against the inner sides of the ends 4 and are not positioned with their outer sides flush with the inner sides of said ends 4 of the cabinet carcass, as shown.

It will be noted that one of the channel members 5 is located relatively close to and parallels the free vertical edge of each end 4 of the cabinet and that another is located adjacent to and parallels the back of the cabinet. Between said front and rear vertical channel members, one or more additional channel members 5 are to be used which preferably will be equally spaced from each other and from the front and rear channels. One of such intermediate channel members is shown in Fig. 1, but it is apparent that the number of intermediate channels may be increased if the depth of the cabinet carcass is increased. In practice it is contemplated that there may be a number of standard sizes of cabinet carcasses. For example one having the same depth but of lesser height than shown in Fig. 1, and others having the same height and lesser height than in Fig. 1, but of greater depth. But in any event the number of standard sizes will be relatively small, usually there will be more than three standard heights, or perhaps not more than two.

Bracket members to support shelves, as shown in Fig. 7, are provided, each made from a single section of sheet metal having a vertical portion 9, at the upper end of which a horizontal ledge 10 is turned at right angles. From a vertical edge of the part 9 a section 11 is turned at right angles extending in an opposite direction to the ledge 10, its lower edge lying in the same plane with the lower edge of the part 9, as shown. At its inner upper corner it terminates in a vertical finger 12. Said bracket members, any desired number of them, may be inserted between the sides 6 of the channels, the fingers 12 hooking back of pairs of the contacting cooperating tongues 8, with the lower edges of the sections 11 resting upon the tongues 8 next below. The section 9 will lie against the inner side of the adjacent end 4 and the ledge 10 extending horizontally therefrom. As shown in Figs. 1 and 4, with such supports connected to the several channels 5 at spaced apart vertical intervals and with front, rear and intermediate supports in horizontal alinement, shelves 13 may be placed upon the horizontal ledges 10 and be carried thereon. In many cases, where shelves alone are used, and no front closure structure is used, the shelves may be spaced different vertical distances apart inasmuch as the very large number of the cooperating supporting tongues 8 permits a very large selection of places at which shelves are to be located.

The spaces between the shelves 13 may be closed by glass doors 14, the body of the glass being held in metallic border strips 15 (Fig. 5). With our invention these glass doors are adapted to be detachably mounted upon fixtures which in turn may be connected to the front channels 5.

At the ends of the doors and between their edges a bracket 16 is spot-welded or otherwise secured to the metal border strip at each end of the glass, having a leg extending rearwardly on which a roller 17 is mounted. The roller 17 is movable lengthwise of a channel guide 18 positioned vertically and which, at its upper portion, is curved in the arc of a circle at 19 and contained as a horizontal channel guide 20. The horizontal portion 20 of the channel guide for the roller 17 has its upper flange welded or riveted or equivalently permanently secured to the lower flange of a second and horizontal channel guide 21. The door at each end and near its upper edge carries a roller 22 which rollers traverse the horizontal channels 21. In connecting the door mounting fixture consisting of the channel guides described, a plurality of brackets 23 are used having outwardly extending fingers 24 at their inner ends and upper corners substantially identical in structure with the section 11 and the finger 12 of the previously described shelf supports, and these are hooked in place, as in Fig. 6, resting upon a lower pair of tongues 8 and hooked behind the next adjacent higher pair of tongues. The channel guides for the door are then located in place and screws 25 (Figs. 5 and 6) pass through the outer ends of the plates 23 and into the rear flanges of the vertical channel sections 18, as in Fig. 5. Two of these supporting plates 23 are indicated in Fig. 4, but of course the number may be increased if desired.

The supporting and guiding structure for the rollers 17 and 22 of a door has connected therewith to the front flange of each channel guide 18 a channel 26, the open side of which is presented toward the end 4 of the cabinet. A thin metal gasket of brass, copper, aluminum or the like, of the form best shown in Fig. 5, has its rear section welded to the rear flange of channel 26 and extends forward and is formed into a finishing loop 28 which, when the fixture is connected to the cabinet, is pressed against a finishing front post or cornice 29 connected at the front edge of each end 4, the looped portions 28 providing finishing gaskets which disguise the joints and presents an attractive appearance. The length of the channel 26 varies. The attachment for carrying the doors is made up for carrying either one, two or three doors, so that the length of the channel 26 will be correspondingly multiples of one, two or three times a single length for a single door. The front end of the upper guide channels 21 reach to the front flange of the vertical channel 26, the rear channel and the web being cut away to permit this. With the door carrying structure in the three standard forms, for either one, two or three doors, any desired arrangement or number of doors which are to be supplied, for example four as shown in Fig. 1, is readily accomplished. At the rear ends of the upper guide chanels 21 a stop block 30 is put, and if it seems desirable, a screw may be passed through this block and through the web of the channel 21 and driven into the adjacent end 4; or the screw may be driven through the web of the channel near its rear end at other places than through the block.

With this construction the disappearing glass drop-doors in front of the spaces between the shelves 13 and between the upper shelf and the top may be opened and closed. It is of course evident that a removal of the doors and their mountings is easily accomplished if at any time that part of the cabinet which is closed at the front by the drop disappearing doors is to be rearranged as may happen at times when a merchant revamps his store.

At the lower part of Fig. 1, and at the upper part of Fig. 9, a frame is shown for carrying sliding glass doors 31. The frame includes upper and lower channel guides and tracks 32 and the lower tracks may carry anti-friction balls or the like for ease of movement of the doors. The vertical sides 33 and **33*a* are of a double channel form with the channels oppositely positioned, as best shown in Fig. 3 and occupy the same relative positions with respect to the ends 4 of the case adjacent which located, as do the two connected channels 18 and 26 of the previously described mounting for the drop disappearing doors 14, and there is used the same thin metal gasket and finish member 27 with the loop 28 at its free forward edge to disguise the joint and present a finished and attractive appearance (see Fig. 3). For the opposite side 33*a*, where the Z-bar side is reversed in position, the gasket 27*a*** is attached as shown in Fig. 3*a*, that is, to the rear side of the central section of the Z-bar and thence alongside the web of the forward section thereof and turned into a loop **28*a*, presenting the same appearance at the joint between such side of the frame and the adjacent finishing pilaster 29 at the forward end and at the end 4 of the case. The connection of the sliding glass door frame to the vertical channel 5 is identical with that used in connecting the mountings for the drop disappearing doors previously described. That is, plates 23 with upwardly extending fingers 24 at their inner ends are inserted in the proper places in the channels and the frame vertical members 33 and 33*a* are connected by screws 25**, as shown in Fig. 3. Removal of the screws permits a detachment of the frame and the sliding glass doors therein if the cabinet is to be altered or the position of the sliding glass doors changed from one part of the case to the other.

In practice there will be a small number of standard heights of frames and sliding glass doors to fit the same. In Fig. 9 the frame is shown detached from the upper position which it is to occupy in the cabinet when installed in place. It is evident that this frame may be placed at different heights at the front of the case, that the frames may be of different heights and may be associated with many different arrangements of shelving either open or closed by drop doors or with drawers, a wide range of arrangements being possible.

In Fig. 11 a horizontal angle bar 34 with vertical and horizontal legs is provided at each end of the vertical leg with an extension **11*a* turned at right angles, said extension having a finger 12*a* at its upper inner corner portion. Such parts 11*a* and 12*a* are identical with the section 11 and finger 12 of the supporting bracket structure shown in Fig. 7. The bars 34 may be applied to each end of the case at the inner side thereof with said end sections 11*a* and fingers 12*a* thereon received between the sides 6 of the front and rear vertical channels 5, and engaging with the lugs 8 struck inwardly from the sides 6** of said channels in the same manner as previously described and as fully illustrated in Fig. 13.

The horizontal angle bars 34 may be used to support horizontal shelves. In practice they are used to support drawer section frames, for example such as illustrated in Fig. 10. The drawer section frames include vertical end plates 35 of flat metal with inturned upper and lower flanges, with intermediate partitions 36 between them which may be one or more in number. At the lower sides of the drawer frame section at both front and rear are connecting cross bars 37 fromed of sheet metal, as shown, and tie bars 38 of flat metal extend horizontally across between the ends and over the flanged upper edge of the upper partition plate 36. Angle bars 39 are used to connect the intermediate partition members with other horizontal cross bars 37 located above the lowermost cross bars, all the parts being spot-welded together and thereby making a strong frame into which sliding drawers may be inserted. The frames for receiving the drawers may also be of a small number of standard heights. The lengths are such that they are readily inserted between the spaced apart ends 4 of the cabinet carcass. In certain cases a frame may rest upon the bottom 1 of such carcass, as in Fig. 14, and in other cases where the drawer section is to be disposed between the upper and lower ends of the cabinet it may be carried at its ends by the bars 34. And of course these drawer receiving frames may be stacked one on top of another to any desired height within the limits prescribed by the height of the carcass.

In Fig. 14 the lower portion of the cabinet carcass below a shelf 13*a*, which in this case may be of wood instead of glass as shown by the shelves 13 in Fig. 1, is occupied with drawers 40. The upper part of the cabinet is open at the front, making a space particularly adapted for the reception of garments. The garments are carried on garment hangers which are suspended from a rod extending lengthwise between the ends 4. Bars 41 have welded thereto plates 23 with fingers 24 of substantially the same structure as that shown in Fig. 6, which plates with fingers are adapted to be inserted between the sides 6 of the front and rear channel members 5 at any desired height. The horizontal rod 42 from which the garment hangers are hung is slotted at its opposite front and rear sides and the metal of the central portion of the bar is cut away at the upper part thereof, as shown in Fig. 17, so that the rod may be slid into place at each end and interlocked with said bars, which may be located at a selected place or places in the height of the cabinet and of the metal channels which support them. In cases where the lower part of the cabinet is partially filled, for example by drawers as in Fig. 14 or with any of the other auxiliaries, it is easy to locate the rod at a lower position in the case of short garments if it seems desirable.

In Figs. 18 and 19 the cabinet carcass is of a lesser height than shown in Figs. 1 and 14, but whether the cabinet is of such lesser height or is of full height, the space therein may receive auxiliaries, each in itself being a self-contained unit. As shown, the unit which is shown comprises an open frame having vertical ends 43, a lower side 44 and an upper side 45 with spaced vertical partitions 47 extending between the upper and lower sides. Said partitions are horizontally grooved at spaced apart distances in both sides and the inner sides of the ends 43 are correspondingly grooved, permitting the slidable insertion of shelves 47 which preferably are of glass though they may be of any suitable material. Such unit may be inserted into the carcass. When inserted in the lower part thereof it would rest upon the bottom 1. But at a higher point within the cabinet carcass it would be supported at each end and at its lower side by bars such as indicated at 34 or by the supports shown in Fig. 7 located at the proper positions. The self-contained unit which is shown in Figs. 18 and 19 is one only of a very large number and variety of such units that may be used.

From the foregoing it is apparent that a very meritorious improvement in store furniture has been produced. The cabinet carcass which in its essentials consists of a bottom, top, back and vertical ends and open at its front side, and with at least front and rear vertical channels like those at 5, housed and received within the grooves at the inner sides of the ends, may, with the great variety of auxiliaries, some of which have been described, be converted into merchandise holding cabinets of many and varied characters and designs. Also it can be very easily utilized to make an open front adjustable shelving unit, either for the whole of its height or for a part thereof. If with changing demands for merchandise the store when it is initially equipped with the store furniture of our invention needs rearrangement for greater capacity for certain merchandise for which there has become a greater demand, and a less capacity for other merchandise in which the demand has fallen off, the rearrangement is easily accomplished. And when a store has been equipped initially in part of its space with structures of our invention, to add other furniture of our invention thereto, with the usual requirement that the initial store furniture shall be rearranged to carry merchandise in a different manner, is also very quickly and readily accomplished without damage or any detrimental effect upon that furniture which was first bought and installed. The quantity production of the cabinet carcasses in the first instance, and of the several auxiliaries which go with it, is a very valuable feature of the present invention. Quantity production means a much lower cost of manufacture and a lower price to the buyer. The cabinet carcass in the several standard heights and depths, if the circumstances call for different depths, may be built ahead in considerable amounts, and the same is true with respect to the attachments or auxiliaries which go therewith. Then for the needs of any merchant, the proper auxiliaries and attachments may be selected for location at the different places in the height of the carcass and the need of any merchant, irrespective of the size of his store, can be supplied.

It will be noted that the channels 5 which receive the shelf supporting brackets are located in the respective ends of the case and that they are customarily viewed angularly through the front of the case and the tongues 8, being located a considerable distance inwardly cannot be seen from that position. The flanges 7 are the only parts which are ordinarily visible and these may be brightly polished and appear as bright double vertical strips which add to the design and appearance of the case rather than detracting from it and at the same time perform their mechanical function perfectly.

The invention is defined in the appended claims and is to be considered comprehensive of all forms of structure coming within their scope.

We claim:

1. In a construction of the class described, a cabinet having a bottom, top, and vertical ends, and a plurality of elongated supports having spaced parallel sides embedded at the inner sides of each end, the depth of the space between said sides of the supports being greatly in excess of the width thereof, one of said supports being adjacent the front edge of each end and one adjacent the rear edge thereof, said supports at their outer portions being substantially flush with the inner sides of said ends and each in its length having a consecutive series of vertically spaced supporting elements located across the space between its sides.

2. In a construction of the class described, a cabinet having a bottom, top, and vertical ends, and a plurality of supports, each having spaced apart sides embedded in said ends at the inner sides thereof with a narrow space between the sides, the depth of which is greatly in excess of its width, said supports extending vertically between the top and bottom of the cabinet, the outer edge portions of said supports being substantially flush with the inner sides of the ends of the cabinet and a plurality of vertically spaced supporting elements carried by and between the sides of said vertical supports, and extending across the space between said sides, one of said vertical supports being located adjacent the front edge of each of said ends of the cabinet.

3. In a construction of the class described, a cabinet carcass comprising, a substantially horizontal bottom and top, and spaced apart vertical ends and a vertical support of sheet metal bent longitudinally into U-shape form embedded in each of said ends of the support adjacent its front edge and extending between the top and bottom of the cabinet, the closed end of said U-shaped support being within the body of the end of the cabinet, and the open side thereof substantially flush with the inner side of the end of the cabinet, each of said supports having the sides thereof spaced a narrow distance from each other with the space between the sides having a depth greatly in excess of its width and means carried by and disposed across between the sides of said U-shaped support and a distance back of the open side thereof and at a plurality of spaced apart points in the length thereof upon which brackets may be carried at selected positions in the length of the support, as specified.

4. In a construction of the class described, a cabinet carcass comprising a substantially horizontal bottom and top, and spaced vertical ends, an elongated vertical support embedded one in each of said ends at the inner side thereof having its outer edge portions substantially flush with the inner sides of the end on which mounted, said elongated support being located between the top and bottom of the cabinet, an open frame having doors mounted therein located between the front edge portions of the cabinet, a plurality of vertically spaced apart supporting plates engaging with selected supporting elements on said supports and extending into the cabinet, and detachable means connecting said plates to said frame.

5. In a construction of the class described, a cabinet carcass comprising, a substantially horizontal bottom and top, and spaced apart vertical ends, and front, rear and intermediate vertical supports embedded in each end of the cabinet at the inner side thereof, said vertical supports substantially paralleling each other and each having closely spaced apart sides, the outer edges of which are substantially flush with the inner sides of the ends of the supports with which associated, the depth of the space between said sides of each support greatly exceeding its width and a plurality of vertically spaced supporting elements carried by and between the sides of each support in the length thereof at an appreciable distance from the inner sides of said ends whereby they are invisible when viewed through said front opening, as specified.

6. In a construction of the class described, a cabinet carcass comprising a bottom, a top, and spaced apart substantially vertical ends, an elongated vertical support embedded in each end of the cabinet at the inner side thereof substantially parallel to and a short distance back of the front edge of each side, said elongated support having spaced apart parallel sides, the outer edge portions of which are substantially flush with the inner side of the end of the cabinet to which connected, a plurality of vertically spaced supporting elements carried on said supports between the sides thereof, brackets connected thereto at selected points in the length of the supports and a door carrying fixture detachably connected with the brackets at each end of the support, combined with a disappearing drop door mounted on and between said door carrying fixtures.

7. In a construction of the class described, a cabinet carcass including a bottom, top, and spaced apart substantially vertical ends, an elongated vertical support embedded in each end of the cabinet at the inner side thereof substantially parallel to and a short distance back of the front edge of each side, said support having spaced apart parallel sides, the outer edge portions of which are substantially flush with the inner side of the end of the cabinet to which connected, a plurality of vertically spaced supporting elements carried by said supports between the sides thereof, brackets connected thereto at selected points in the length of the supports, an open door frame having vertical ends inside of and parallel to said vertical supports detachably connected to said brackets, and flexible gasket members connected at the outer sides of the vertical ends of said frame and having free forward edges formed into filling gaskets to disguise the joint between the ends of the open frame and the ends of said cabinet.

8. In a construction of the class described, a cabinet carcass comprising a substantially horizontal bottom and top and spaced apart vertical ends, a vertical support embedded in each end of the cabinet at the inner side and near the front edge of each end, said vertical supports having spaced apart parallel sides located closely adjacent each other, the outer edge portions of which are substantially flush with the inner sides of the ends of the supports with which connected, a plurality of vertically spaced supporting elements carried by and between the sides of each support in the length thereof, bracket members inserted between the sides of the supports detachably connected with selected supporting elements on the support and extending into the cabinet away from the adjacent inner sides of the ends of the cabinet, and an open frame in which closure doors may be mounted connected with said projecting portions of the brackets and lying in front thereof.

9. In a construction of the class described, a cabinet having a bottom, top and vertical ends, a plurality of elongated supports embedded at the inner sides of each end, one adjacent the front edge of each end and one adjacent the rear edge thereof, said supports having parallel sides spaced a short distance from each other, the depth of the space between said sides greatly exceeding its width, supporting elements carried by and between the sides of said supports in spaced apart vertical relation to each other and positioned a distance inward from the inner sides of the ends of the cabinet greater than the width of the space between the sides of the supports, and members of flat metal having portions located in vertical planes which extend into said vertical supports between the sides thereof and between adjacent supporting elements and project into the cabinet beyond the inner sides of the ends thereof, as specified.

10. In combination, a case having a back, ends and a front opening, shelf supporting channels embedded in said ends and opening toward the interior of the case whereby they are viewed angularly through the front opening, vertically spaced lugs extending between the sides of said channels and located an appreciable distance inward from the openings of the channels whereby they are invisible when the channels are viewed angularly and shelf supporting brackets having hooked portions insertible into said channels and hooked over the lugs therein.

11. In a construction of the class described, a cabinet carcass including, a bottom, top, and spaced apart substantially vertical ends, an elongated vertical support embedded in each end of the cabinet at the inner side thereof substantially parallel to and a short distance back of the front edge of each side, said support having closely spaced apart parallel sides, the outer edge portions of which are substantially flush with the inner side of the end of the cabinet in which embedded, a plurality of vertically spaced supporting elements carried by said supports between the sides thereof, brackets having vertical flat metal portions inserted between the sides of the support and connected to selected supporting elements, and a substantially rectangular open door frame having vertical ends and upper and lower horizontal cross members detachably connected to said brackets.

12. In a construction of the class described, a cabinet carcass including a substantially horizontal bottom and top and spaced apart substantially vertical ends, an elongated vertical support embedded in each end of the cabinet at the inner side thereof substantially parallel to and a short distance back of the front edge of each side, said supports each having parallel sides spaced apart a short distance, the depth of the space between the sides greatly exceeding the distance between said sides of the support, a plurality of vertically spaced supporting elements carried by said supports between the sides thereof, brackets detachably connecting with selected supporting elements in the length of the supports, said brackets having flat portions located in vertical planes extending into the space between the sides of said vertical supports, and a substantially rectangular open door frame having vertical ends substantially parallel to and lying within the front edge portions of the ends of said cabinet carcass connected to said brackets.

13. A cabinet carcass having spaced apart vertical ends and open at its front side, elongated vertical supports at each end of the cabinet, one located adjacent the front edge of each end of the cabinet and others rearwardly thereof and in substantially parallel relation thereto, each of said supports comprising closely spaced flat sides of metal, the depth of the space between the sides of the support greatly exceeding its width, vertically spaced supporting elements on said supports, said supports being embedded in the ends of the cabinet and the supporting elements thereon being located between the inner and outer sides of said ends of the cabinet, whereby the space within the cabinet is free of any inwardly extending parts, means for mounting shelves upon and between the supports carried by the opposite ends of the cabinet and means comprising flat plates located in vertical planes inserted at selected portions in the height of the cabinet for detachably mounting door carrying fixtures upon the frontmost supports, whereby the interior space of the cabinet may be wholly or partially equipped with shelves, or with independent units receivable within and between the ends of the cabinet, and whereby selected portions at the front of the cabinet may be left either open or closed by doors, and any and all doors or shelves removed therefrom, as specified.

14. In a construction of the class described, a cabinet having a bottom, top and vertical ends, each of said ends at its inner side having a plurality of spaced, parallel, vertical narrow slots therein, the depths of which greatly exceeds their widths, vertically spaced horizontal supporting elements between the sides of the slots located an appreciable distance inwardly from the openings of said slots whereby they are invisible when the inner sides of the ends of the cabinet are viewed angularly from the front of the cabinet, and detachable and interchangeable fixtures adjustably mounted within the cabinet and on the ends thereof, said fixtures having flat vertical bracket portions having thicknesses slightly less than the narrow widths of said slots, said bracket portions extending into the slots between and detachably engaging with selected supporting elements and held thereby against upward or downward movements or outward bodily movement in a direction at right angles to the ends of the cabinet.

15. In a construction of the class described, a cabinet having a bottom, top and vertical ends, each of said ends at its vertical inner side having a plurality of spaced narrow vertical slots therein extending partially through the ends of the cabinet and having openings at the inner sides thereof, vertically spaced horizontal supporting elements between the sides of the slots located at an appreciable distance inwardly from the openings of said slots, whereby they are invisible when the inner sides of said cabinet are viewed angularly from the front of the cabinet, and detachable and interchangeable fixtures adjustably mounted on said ends of the cabinet, said fixtures having flat bracket portions in vertical planes and extending into said slots and having means to detachably engage with said supporting elements, the vertical dimensions of said flat bracket portions being greatly in excess of their thicknesses and being slightly less in thickness than the widths of the slots so as to be freely received therein, adjacent surfaces of the sides of the slots and of the vertical bracket portions being in close proximity to each other, for the purposes specified.

16. In a construction of the class described, a cabinet having a bottom, top and vertical ends, each of said ends at its inner side having a plurality of narrow vertical parallel slots therein spaced from each other, vertically spaced horizontal supporting elements between the sides of the slots located an appreciable distance inwardly and between the bottoms of said slots and the openings thereof, said slots in depth being greatly in excess of their widths and extending from the inner sides of the ends of the cabinet partially therethrough, detachable and interchangeable fixtures having inwardly extending vertically positioned flat bracket portions inserted into said slots, said flat vertical portions of the bracket members being provided with means to engage with selected horizontal supporting elements and resting at their lower edges upon the supporting elements next below.

17. In a construction of the class described, a cabinet having a bottom, top and vertical ends, each of said ends at its inner side having a plurality of spaced parallel vertical narrow slots therein, the depths of which greatly exceed their widths, said slots being of less depth than the thickness of the ends, vertically spaced horizontal supporting elements between the sides of the slots located between the bottoms of said slots and the openings thereof and detachable and interchangeable fixtures adjustably and interchangeably mounted on said ends of the cabinet at the inner sides thereof having flat vertical portions extending into said slots and detachably connecting with selected supporting elements, as specified.

PAUL G. WILLIAMS.
KENNETH C. WELCH.